(12) United States Patent
Bernhardt

(10) Patent No.: US 7,010,893 B2
(45) Date of Patent: Mar. 14, 2006

(54) CONCRETE FLOOR, PARTICULARLY A TEMPERATURE CONCRETE FLOOR

(76) Inventor: Gerold Bernhardt, Birkenweg 9, 64295 Darmstadt (DE)

( * ) Notice: Subject to any disclaimer, the term of this patent is extended or adjusted under 35 U.S.C. 154(b) by 137 days.

(21) Appl. No.: 10/437,672

(22) Filed: May 14, 2003

(65) Prior Publication Data

US 2004/0050945 A1 Mar. 18, 2004

(30) Foreign Application Priority Data

May 16, 2002 (DE) .......................................... 102 22 227

(51) Int. Cl.
*E04F 17/04* (2006.01)
*F16L 11/15* (2006.01)

(52) U.S. Cl. .................... 52/302.3; 52/302.1; 52/220.3; 52/576; 165/49; 138/121; 138/157

(58) Field of Classification Search ................ 52/302.1, 52/302.3, 576, 577, 220.3; 165/49, 50; 138/38, 138/121, 157, 163, 177, DIG. 11
See application file for complete search history.

(56) References Cited

U.S. PATENT DOCUMENTS

| | | | | |
|---|---|---|---|---|
| 906,106 | A | * | 12/1908 | Christoph .................... 138/163 |
| 2,621,027 | A | * | 12/1952 | Tatsch .......................... 165/56 |
| 3,885,296 | A | * | 5/1975 | Stout ............................ 29/433 |
| 3,999,341 | A | * | 12/1976 | Stout .......................... 52/220.3 |
| 4,213,929 | A | * | 7/1980 | Dobson ....................... 264/129 |
| 5,097,893 | A | * | 3/1992 | Trimble ........................ 165/46 |
| 5,327,737 | A | | 7/1994 | Eggemar |
| 5,388,408 | A | | 2/1995 | Lawrence |
| 5,390,660 | A | * | 2/1995 | Danielson ............ 126/271.2 R |
| 5,396,747 | A | | 3/1995 | Breuning |
| 5,579,620 | A | * | 12/1996 | Kuo ............................. 52/447 |
| 5,773,406 | A | | 6/1998 | Gross |
| 5,799,703 | A | | 9/1998 | Kanao et al. |
| 5,879,491 | A | * | 3/1999 | Kobayashi .................... 156/71 |
| 6,079,170 | A | * | 6/2000 | Slebos ........................ 52/220.1 |
| 6,131,616 | A | * | 10/2000 | Tatsuta et al. .............. 138/121 |
| 6,338,507 | B1 | * | 1/2002 | Amatsutsu ................... 285/321 |
| 6,457,288 | B1 | * | 10/2002 | Zambelli et al. ........... 52/220.2 |

FOREIGN PATENT DOCUMENTS

| | | |
|---|---|---|
| DE | 85 19 146.9 | 12/1985 |
| DE | 198 32 289 | 1/2000 |
| GB | 511122 | 8/1939 |
| GB | 1148540 | 4/1969 |
| WO | WO 92/06253 | 4/1992 |

OTHER PUBLICATIONS

Patent Abstracts of Japan—2001123818—May 8, 2001.

* cited by examiner

*Primary Examiner*—Brian E. Glessner
(74) *Attorney, Agent, or Firm*—Schiff Hardin LLP

(57) ABSTRACT

The present invention is directed to a concrete floor, particularly a temperable concrete floor, containing an upper side and an underside, containing first concrete-free spaces, particularly cavities, that comprise at least one first wall surface, particularly two, three, four or more wall surfaces, along at least one section, said at least one first wall surface being essentially planar, concave, convex or corrugated or denticulate and being aligned not essentially parallel or perpendicular to the underside and/or upper side of the concrete floor, and containing second concrete-free spaces, particularly second cavities, whereby the first concrete-free spaces, particularly two, three, four or a plurality of first concrete-free spaces, and the second concrete-free spaces are arranged in the concrete floor in alternating succession, at least in sections, and, in particular, connectible to one another or connected to one another, whereby said first concrete-free spaces have a larger maximum diameter in crossection than said second concrete-free spaces.

42 Claims, 8 Drawing Sheets

CONCRETE FLOOR, PARTICULARLY A TEMPERATURE CONCRETE FLOOR

Figure 1:
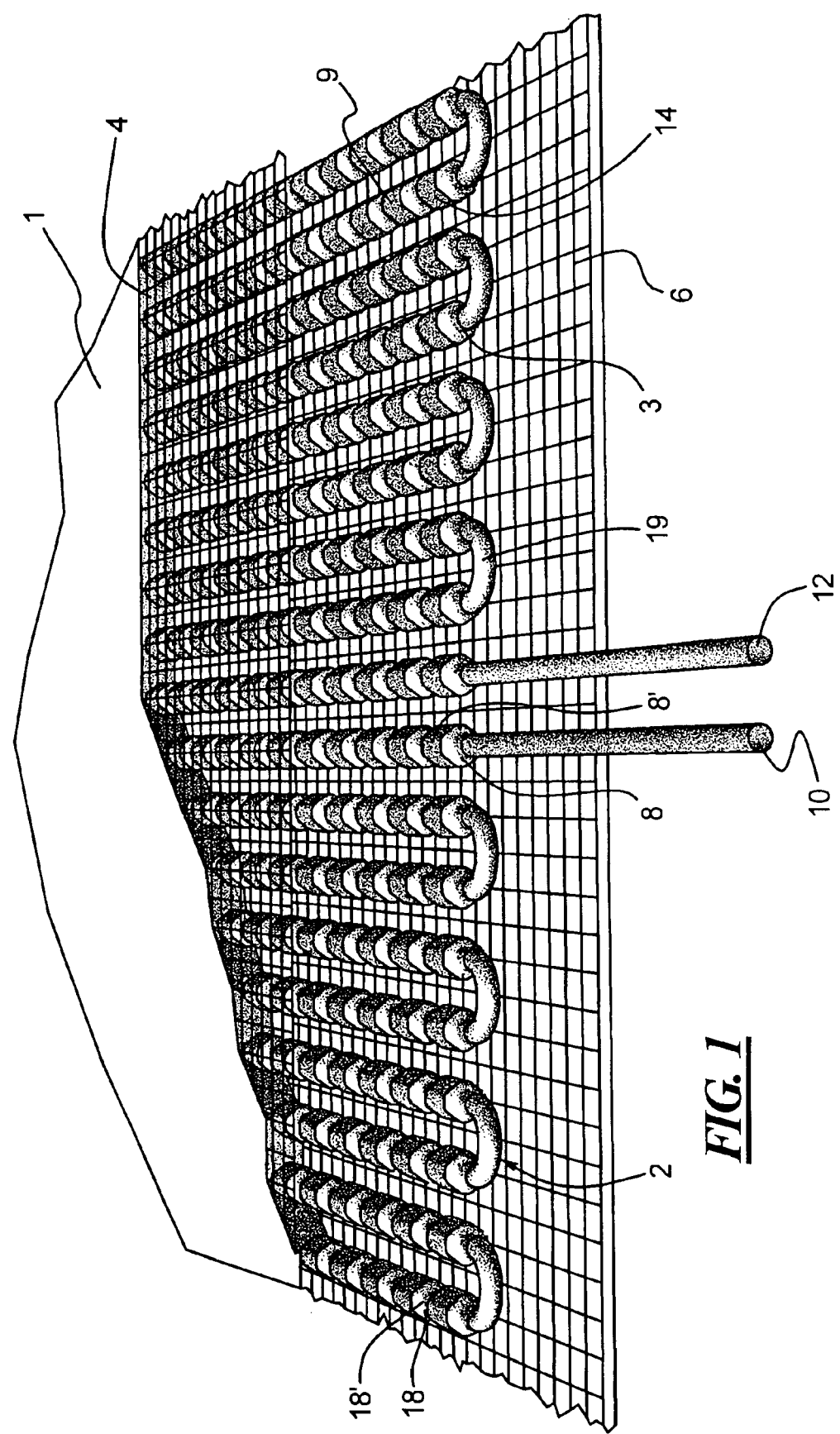

The present invention is directed to a concrete floor, particularly a temperable concrete floor, to its employment as a structure floor as well as to a conduit and the employment thereof for tempering concrete floors.

Approaches for employing structure floors of concrete for cooling or for heating parts of a building instead of or in addition to air conditioning systems or, respectively, separate heating systems are known to a person skilled in the art. Thus, thermo-active structural systems have already been disclosed wherein concrete floors are used as energy stores. This succeeds, for example, in that a conduit system containing a fluid is laid loop-like in a concrete floor. As a rule, such conduit systems comprise a circular crossection throughout.

DE 40 27 833 A1 discloses an installation for heating or cooling buildings that is intended to replace what are referred to as cooling floors, which can either be drop-ceilings with a cooling systems disposed behind it or concrete floors with an integrated cooling system, by means of an improved design. To this end, a structure floor is proposed that is permeated by a fluid channel system and to which cavities carrying fresh air are additionally allocated, whereby openings for the admission of the fresh air and openings for the discharge of the heated or cooled fresh are into dwelling areas of the building are provided. These cavities are regularly formed by double floors built spaced on the floor of a story. Such a design is very space-consuming as well as cost-intensive and, accordingly, usually comes into consideration only for very large-area story floors.

According to DE 196 09 641 A1, rooms can be cooled in that are is conducted through pipes lying in concrete floors, whereby a cooling of the surface of the concrete floor ensues in that the core of the concrete floor is first cooled via the air-conducting pipes having an essentially circular crossection. An effective heat transfer is achieved in that the pipes comprise ribs at their inside and outside. The individual ribs proceeding at identical intervals from the inside of the cooling conduit project over about one-fourth of the diameter of the cooling conduit into the cooling conduit in the direction of the midpoint thereof and comprise a thickness that approximately corresponds to the thickness of the outside wall of the cooling conduit. Demanding manufacturing processes are required in order to obtain pipes having the effective geometry demanded in DE 196 09 641 A1 and these already run counter to a mass production, for example for traditional residential construction, for cost reasons.

DE 100 63 777 A discloses the tempering of rooms via a component capable of thermal storage that has an exterior surface in contact with a cooling element such that the thermal load stored in the component is eliminated by the flow of cold water flowing through the cooling element or by phase modification of latent stores built into the building material. A multiple cooling effect arises as a result thereof, first by the radiant transmission that is simultaneous with the creation of the heat and likewise by free convection of the sides facing toward the rooms. The proposed device can also be fashioned as a wall structure and have an interactive connection with a vertical convector shaft. What is disadvantageous is that water is utilized for an effective tempering. This requires great care in the manufacture of the conduit systems employed as well as when laying these in order to avoid leaks. The latter quickly lead to uselessness of the complete cooling system since the device embedded in concrete can only be repaired or, respectively, sealed to a limited extent. On the other hand, water damage of any type whatsoever is always to be avoided in buildings.

DE 30 06 672 A1 discloses concrete floors that contain internal cavities that, on the one hand, keep the weight of the component as low as possible and, on the other hand, leave so much space that reinforcement with steel rods is possible. The hollow members of sheet metal that are employed comprises an approximately cubic shape having four pipe sockets attached to lateral surfaces, all of said pipes sockets lying in one plane. The hollow members are connected via sleeves emplaceable over the pipe sockets to form a channel system that allows warm air to be blown into the cast concrete floor, the drying time thereof being considerably shortened as a result thereof. Over and above this, this channel system should be suitable for accepting an electrical cabling as well as for heating the concrete floor from the inside. It is disadvantageous that, due to the high degree of networking of the hollow members connected to one, air cannot be effectively conducted through the concrete floor for cooling or heating. The strength of these floors also leaves something to be desired.

The employment of closed hollow members, frequently in spherical form, that are integrated into a concrete floor upon manufacture thereof is disclosed at least for reducing the weight of structure floors of concrete, for example by German Letters Patent Number 812 833, by EP 0 552 201 A1 or by DE 196 07 254 A1.

For reducing the weight of structure floors of concrete, U.S. Pat. No. 3,213,581 discloses that a plurality of cylindrical pipes arranged parallel behind one another be worked into the concrete layer. These cylindrical pipes communicate neither with each other nor with the outside air.

Finally, EP 0 848 745 A1 proposes a concrete floor slab into which a self-contained system of air conduits connected to one another and that serves for heating this floor slab is embedded.

It would be desirable to be able to utilize concrete floors that comprise a lower dead weight compared to traditional concrete floors without having sacrifices in the rigidity accompanying the weight reduction.

It would also be desirable to have recourse to fluid conduction systems for tempering structure floors or, respectively, floor slabs that are equally suited for heating as well as for cooling without, however, having to accept the disadvantages of the conduit systems known from the Prior Art.

The present invention was therefore based on the object of making a concrete floor available that leads to a considerable weight-saving in building construction without having to accept sacrifices in rigidity and that—insofar as desired—can also be tempered in a simple and very efficient way. Over and above this, the desired concrete floor, particularly a temperable concrete floor as well, should be capable of being simply and cost-beneficially manufactured, assist in generating a good indoor climate in view of temperature and humidity after fabrication and should contribute to a more beneficial energy efficiency compared to traditional air-conditioning and/or heating systems.

Accordingly, a concrete floor, particularly a temperable concrete floor, has been found, containing an upper side and an underside, containing first concrete-free spaces, particularly cavities, that comprise at least one first wall surface, particularly two, three, four or more wall surfaces, along at least one section, said at least one first wall surface being essentially planar, concave, convex or corrugated or denticulate and being aligned not essentially parallel or perpendicular to the underside and/or upper side of the concrete floor, and containing second concrete-free spaces, particularly second cavities, whereby the first concrete-free spaces, particularly two, three, four or a plurality of first concrete-free spaces, and the second concrete-free spaces are arranged in the concrete floor in alternating succession, at least in sections, and, in particular, connectible to one another or connected to one another, whereby said first concrete-free spaces have a larger maximum diameter in crossection than said second concrete-free spaces. According to an expedient development, at most one or even no first wall surface of the first concrete-free spaces is aligned essentially parallel or perpendicular to the underside and/or upper side of the concrete floor. In this embodiment, rounded-off or cut-off corners or edges of such first concrete-free spaces or, respectively, cavities should not be taken into consideration as non-parallel wall surfaces of these spaces. In one embodiment, the first wall surfaces that are essentially planar, convex, concave, corrugated or denticulate or shaped in some other way can also be understood in the sense of a superstructure that itself in turn comprises subsections or smaller surfaces that can be aligned parallel to the upper side or underside of a concrete floor. For example, the first wall surfaces are connected to one another along common edges or via second wall surfaces.

Further, the employment of the inventive concrete floor as story floor or as floor slap for buildings was found. A conduit was also found, as was the employment thereof for tempering, in particular, concrete floors.

The first and second concrete-free cavities are preferably arranged in alternation, particularly upon formation of a conduction unit. For example, respectively two first and second concrete-free spaces, particularly a plurality of such spaces, can be connected to one another in an alternating arrangement.

All standard story floors or floor slabs fabricated of concrete come into consideration as concrete floors. Recourse is preferably had to reinforced concrete floors. Due to its mechanical properties, the inventive concrete floor system is also suitable for, among another things, flat slab floors as well as for cage-work floors, but also comes into consideration for structure walls.

A reinforcement or, respectively, armoring is preferably present under the surface of the upper side and/or under the surface of the underside of the concrete floor. This reinforcement/armoring is preferably applied under and/or above the second concrete-free spaces.

What concrete-free is intended to mean in the sense of the invention is that these regions of the concrete floor comprise no concrete and, for example, can form a cavity. This (hollow) space can also be completely or partially filled with a material that is not concrete. However, these spaces can also contain gasses and/or liquids or also comprise an under-pressure or over-pressure.

Among other things, first and second concrete-free spaces differ in that, in particular, they comprise a different size in their transverse expanse. Accordingly, the upper or lower region of the first concrete-free spaces is usually closer to the upper side or, respectively, underside of the concrete floor than the upper or lower region of the second concrete-free spaces. A distinction can thus already mainly be made via their different expanse in the direction toward the upper side and underside of the concrete floor. In a preferred embodiment, the crossection of the first concrete-free spaces completely covers the crossection of the second concrete-free spaces and goes beyond the latter. The crossectional diameter of the first concrete-free spaces generally lies in the range for about 5 cm to about 50 cm, that of the second concrete-free spaces generally lies in the range from about 2 cm to about 40 cm.

The first concrete-free spaces preferably have at least two wall surfaces available that reside at an angle relative to one another.

In one embodiment, these wall surfaces of the concrete-free spaces, particularly of the first concrete-free spaces, have a concave or convex arc. Accordingly, a change in direction from one wall surface to the adjoining wall surface upon formation of a concrete-free space can be found in this embodiment. In this embodiment, at least the first concrete-free spaces do not comprise a circular-symmetrical crossection over the majority part of their longitudinal axis. Of course, wall surfaces that represent a planar surface are also covered.

A wall surface that can in fact be structured in and of itself and/or, for example, comprises bulges or indentations is also an essentially planar wall surface whose course, however, is aligned overall along an essentially planar surface. Slight deviations from this planar course, i.e. slight curvatures of this planar surfaces serving only for the alignment of the wall, are likewise covered.

It must be noted in a preferred development that the first and/or the second concrete-free spaces comprise at least two, particularly three, four, five or more, first wall surfaces at least along a section particularly having an essentially polygonal crossection, said first wall surfaces being not aligned essentially parallel or perpendicular to the underside and/or upper side of the concrete floor.

It is also inventively provided that, at least along a section, the first and/or second, particularly the first, concrete-free spaces have an essentially planar, corrugated, convex and/or concave, second wall surface and/or an edge, particularly a cut-off, rounded-off and/or profiled edge, available that is aligned essentially parallel to the upper side of the concrete floor and/or comprises a shorter distance from the upper side—particularly on average—than the first wall surfaces of first and/or second concrete-free spaces and/or have an essentially planar, corrugated, convex and/or concave, second wall surface and/or an edge, particularly a cut-off, rounded-off and/or profiled edge, available—at least along a section—that is aligned essentially parallel to the underside of the concrete floor and/or comprises a shorter distance from the underside—particularly on average—than the first wall surfaces of first and/or second concrete-free spaces. In addition to the second wall surfaces, the first wall surfaces then represent, for example, the remaining wall surfaces.

It can thereby be provided that at least one edge of the section of the first and/or second concrete-free space having an essentially polygonal crossection is aligned such that this mainly, particularly exclusively, comprises a shorter distance from the underside of the concrete floor than the wall or, respectively, edge surfaces adjoining this edge and/or that a further edge of this section mainly, particularly exclusively, comprises a shorter distance from the upper side of the concrete floor than the wall or, respectively, edge surfaces adjoining this edge. The edges can be fashioned, for example, sharp-edged, nearly sharp-edged or, too, rounded off or, respectively, flattened to a more or less pronounced extent. These edges are essentially characterized in that wall surfaces residing at a specific angle relative to one another, particularly planar, concave and/or convex wall surfaces that can also be structured in and of themselves, meet one another thereat.

In another preferred development, an inventive concrete floor is characterized in that the first and/or second, particularly the first, concrete-free spaces have an essentially planar, corrugated, convex and/or wall surface available to them at least along a first section, said wall surface being aligned essentially parallel to the upper side of the concrete floor and, in particular, comprising a shorter distance from the upper side on average than the remaining wall surfaces, and/or have an essentially planar, corrugated, convex and/or wall surface available to them that is aligned essentially parallel to the underside of the concrete floor and, in particular, comprises a shorter distance from the underside on average than the remaining wall surfaces.

The inventive concrete floor regularly has and underside and an upper side available, whereby the thickness of the concrete floor, i.e. the distance between underside and upper side, can also vary within a concrete floor. Further, underside and upper side need not necessarily be aligned essentially parallel to one another. For example, suitable concrete floors have a thickness in the range from about 10 to 60 cm, particularly in the range from approximately 15 to 40 cm, available.

Inventive concrete colors have first and second concrete-free spaces available that are preferably present in the core of the concrete floor. The first and second concrete-free spaces are preferably arranged such that an armoring or reinforcement is unproblematically possible with traditional means.

First concrete-free spaces and second concrete-free spaces are preferably present in alternating succession in the concrete floor of the invention, at least in sections.

It is thereby advantageous when, in particular, the successive first and second concrete-free spaces are connected to one another, particularly upon formation of a conduit or, respectively, channel system.

The transition from first to second concrete-free spaces and vice verse usually ensues via tapering or, respectively, spreading wall elements that describe a further, third concrete-free space. These connecting wall elements can assume the shape of truncated cones in a preferred embodiment. Over and above this, these connecting wall elements can be structured in and of themselves, as described for the wall surfaces of the first and second concrete-free spaces, and, for example, can comprise indentations and protrusions or, respectively, beads.

In an alternative development of the invention, the first and second concrete-free spaces are designed with an essentially cylindrical crossection and are connected to one another to form a channel system via connecting wall elements shaped like truncated cones, as described above. This channel system preferably has at least one admission opening and at least one discharge opening available.

Of course, further, it is also possible when first and second concrete-free spaces that are not present in succession but, for example, lie next to one another are connected to one another via side channels. These side channels can, in particular, also comprise a second concrete-free space that, for example, can produce a direct connection between two first concrete-free spaces.

In a further embodiment, the present invention provides that the concrete-free spaces contain a plastic, particularly a foamed plastic. For example, polyurethane foams come into consideration as suitable plastics.

Particularly when the first and second concrete-free spaces are not completely filled with a material like plastic, it is especially preferably provided that the concrete-free spaces or parts thereof contain a gas and/or a fluid, whereby, in particular, this gas and/or fluid can flow through these concrete-free spaces. Coming into consideration as suitable gasses are, for example, air or—in particular—inert gasses such a nitrogen or argon. Suitable fluids include water as well as water saturated with salt, which is also referred to as brine. Gasses and fluids having a high heat capacity are preferably utilized and air is especially preferred. A considerable cooling of the total floors and, thus, of the adjacent rooms as well already regularly succeeds by conducting cool night air through the conduit system of the inventive concrete floors.

In another embodiment, the conduit system can be in communication with the rooms lying therebelow and/or thereabove via admission openings through the concrete floor. Cool air can proceed into the interior rooms of the building and heated air can be eliminated in this way.

In order to design a flooding of the concrete-free spaces with gas and/or fluid in an especially effective way, one development of the invention provides that the conduit or, respectively, channel system present in the concrete floor comprises at least one admission opening and at least one discharge opening. The conduit system can thereby also be designed such that an admission and a discharge are situated immediately next to one another, even if this is not absolutely necessary for the invention to succeed. Further, a filter can be provided, particularly in the region of the admission opening.

Another advantageous aspect of the invention takes into consideration that the first concrete-free spaces particularly arranged in alternation with second concrete-free spaces essentially coincide in shape and/or size and/or that at least two successive, first concrete-free spaces connected to one another via a second concrete-free space comprise an essentially uniform crossectional shape, particularly along the connecting axis, whereby particularly these first concrete-free spaces are essentially uniformly aligned with reference to their crossectional shape. In the present case, "uniformly" or "in the same direction" also covers a completely uniform arrangement of first concrete-free spaces, so that, for example, identical wall surfaces essentially comprise a uniform angle relative to a horizontal or vertical plane.

In a further embodiment, the present invention provides that at least sections of at least one wall surface of the first and/or second, preferably first concrete-free spaces comprises at least two successive indentations at the inside and/or outside separated by a bulge that extend essentially over the entire circumference of the crossection, preferably in an essentially parallel alignment. Preferably, the first concrete-free spaces comprise indentations and bulges following one another in periodic alternation over the entire surface. An effective tempering is usually already achieved when the indentations do not extend in the direction of the middle of the concrete-free space.

It has proven especially advantageous that, in particular, the crossections of the first concrete-free spaces essentially form the shape of a triangle, quadrangle, pentagon, hexagon, heptagon or octagon, particularly the shape of a square, trapezoid or rectangle.

Over and above this, it is inventively proposed that the crossections of the second concrete-free spaces are fashioned essentially circular or elliptical.

Alternatively, a concrete floor, particularly a temperable concrete floor comprising an upper side and an underside, is inventively proposed, whereby first concrete-free spaces, particularly first cavities, and second concrete-free spaces, particularly second cavities are contained in this concrete floor, said first and second concrete-free spaces being connectible or connected to one another, particularly upon formation of a channel system preferably comprising at least one admission opening and at least one discharge opening, and, in particular, being present in alternating succession, whereby said first concrete-free spaces comprise a smaller and/or a larger, preferably a larger maximum diameter in crossection than said second concrete-free spaces, and whereby said first and second concrete-free spaces essentially comprise a cylindrical shape and are connectible or, respectively, connected to one another via conic frustum-shaped wall elements.

Insofar as relates to the superstructure of the alternating first and second concrete-free spaces, it has proven expedient when concrete-free first and second spaces that alternate in succession are arranged essentially along a straight or curved line. These first and second concrete-free spaces connected to one another preferably form a segment of a conduit system. Two or more conduit segments can be used for providing the inventive concrete floor with a preferably non-branched conduit system upon application of a geometrical ordering pattern.

Concrete floors can thereby be characterized in that at least two conduit segments proceed essentially parallel to one another, whereby these conduit segments are, in particular, connectible or, respectively, connected via second concrete-free spaces. Additionally, a rectangular arrangement of these conduits segments is also frequently expedient.

It is provided in a further development of the invention that at least three, preferably a plurality, of first and second concrete-free spaces are successively arranged, particularly in alternation, particularly upon formation of a conduit or of a conduit unit, for example, a first conduit train can be formed of 10, 20, 50 or 100 or an arbitrary smaller or greater number of alternating first and second cavities. A corresponding, second conduit train can be connected to the aforementioned first conduit train and, for example, proceed parallel thereto or essentially parallel thereto. When this arrangement is continued with further, correspondingly designed conduit trains, then a very effective arrangement of alternating first and second cavities is obtained in a temperable concrete floor. Of course, the respective conduit trains can also be arranged not essentially parallel to one another.

A further expedient development of the inventive concrete floor provides that a narrow side, particularly a flattened or inwardly arced narrow side of the first and/or second concrete-free spaces faces or, respectively, face the upper side and/or underside of the concrete floor. It has proven especially advantageous when at least the first concrete-free spaces or, respectively, cavities are embedded in a concrete floor standing on an edge, narrow side or a rounded edge. For better stabilization, particularly in the fabrication of the inventive concrete floors, it can thereby be provided that these edges, verges or narrow sides comprise at least one indentation fashioned in the direction of the inside of the cavity. In the inventive concrete floors, all first concrete-free spaces and/or all second, free concrete-free spaces are preferably respectively fashioned essentially identical in shape and size. Further, it has proven expedient when not only a lower verge, edge or narrow side faces toward the underside of the concrete floor but when an upper verge, an upper edge or narrow side also faces toward the upper side of the concrete floor at the same time. In one embodiment of the inventive concrete floors, [. . . ] can comprise, in particular, first cavities having a crossection in the form of a rectangle, square or parallelogram, whereby, of course, these crossectional shapes are also intended to comprise those whose corners are flatted or, respectively, cut off and/or that have inwardly facing indentations. Of course, crossectional shapes of a triangle or of other polygonal structures are also suitable. A surprising mortality [sic] gain of the inventive concrete floors can be achieved with the arrangement of the first concrete-free spaces placed, so to speak, on edge, this being all the more surprising since this effect even occurs given a very dense packing of, in particular, alternating first and second concrete-free spaces.

The inventive concrete floors can be manufactured in the most various ways. One method, for example, is comprised therein that hollow members are placed into the concrete floor to be produced, for example between reinforcing mats, and are surrounded by concrete that has not yet set. These hollow members essentially define the shape and size of the first and second concrete-free spaces. For example, these hollow members can comprise metal and/or plastic walls. In one embodiment, the hollow members to be embedded are self-supporting, i.e. are not noticeably deformed by the weight of the concrete that embeds them or by the weight of the reinforcement that may be potentially lying on them. Correspondingly pre-shaped bodies of metal or plastic, respectively having an adequate thickness, particularly come into consideration therefor. Corresponding hollow members of plastic, preferably polypropylene, polyethylene or co-extruded polyethylene can, for example, be obtained by means of blow molding. Especially when the hollow members for first and second concrete-free spaces form a through conduit system, it is thereby advantageous that the conduit system comprises no seam and, thus, no possible rupture point.

In another development, hollow members that are not self-supporting can also be utilized for the production of the first and second concrete-free spaces. For example, closable containers that are filled with air or gas and that preferably comprise an elevated internal pressure come into consideration therefor. These containers assume the shape of the first and second concrete-free spaces to be formed in the concrete floor. It is no longer necessary to maintain the pressure in these containers after the concrete has cured. Especially when these non-self-supporting containers form a conduit system, air gasses or liquids can circulate through the concrete-free spaces. For example, films that are also gas-tight or, respectively, airtight at least for a specific time span that suffices for the curing of the concrete represent suitable materials for the non-self-supporting containers. Of course, laminates composed of a plurality of film layers such as, for example, air mattresses also come into consideration.

Another manufacturing method is characterized in that concrete-free shaped members, preferably having a low density, in the shape of the first and second concrete-free spaces that do not comprise any hollow members are worked into the concrete floor. Suitable materials for these shaped members comprise, for example, foamed systems such as polymer foams, for example polyurethane foams. Foamed or, respectively, expanded polystyrol, which is also known under the trademarks Styropur® and Styrodur®, can also be utilized. These shaped members can be fabricated of one piece or be composed of a plurality of individual, smaller shaped members, for example in the form of globes, balls or chips, and form the concrete-free space.

In one embodiment of the invention, a conduit or, respectively, a conduit system is embedded in the concrete floor.

Accordingly, the present invention also comprises a conduit, particularly having at least one pipe admission and at least one pipe discharge, whereby at least two, particularly at least ten, first and second pipe sections following one another in alternation [. . . ], whereby said conduit comprises a pipe crossection having a polygonal or nearly polygonal crossectional area at least along a first pipe section, whereby the diameter of the crossection of the second pipe sections of the conduit between successive first pipe sections is smaller than the largest possible crossectional diameter of these first sections, whereby at least one wall surface of at least one first and/or second pipe section, particularly a plurality thereof, comprises at least one indentation in the direction toward the inside of the conduit at least in sections in longitudinal direction of the conduit or at least one edge section of at least one first and/or second pipe section, particularly a plurality thereof, is present rounded off, flattened and/or profiled.

It can thereby be provided according to an expedient development that the first pipe sections, particularly arranged alternating with second pipe sections, essentially coincide in shape and/or size and/or that at least two successive first pipe sections connected to one another by a second pipe section are provided with an essentially uniform, polygonal crossectional shape, particularly along the connecting axis, whereby, in particular, these first pipe sections are essentially uniformly alignable or, respectively, aligned with respect to their crossectional shape.

The conduit embedded in the concrete floor or, respectively, the embedded conduit system can be fabricated, for example, of metal, particularly or a thermally conductive metal or, respectively, a corresponding metal alloy, of a plastic, preferably polyethylene or polypropylene, or of a material fired from clay. In a preferred embodiment, the conduit or, respectively, the conduit system are [sic] provided with at least one first section that comprises a polygonal pipe crossection, for example in the form of a triangle, quadrangle, pentagon, hexagon, heptagon or octagon, whereby a rectangular, quadratic or trapezoidal or, respectively, a nearly rectangular, quadratic or trapezoidal pipe crossection is preferred. The edges of these first pipe sections can be fashioned sharp-edged, rounded off or flattened to a greater or lesser extent. Another inventive embodiment of a conduit employable for tempering concrete floors is characterized in that at least one wall surface of a first and/or second pipe section, particularly of a first pipe section, comprises at least one indentation in the direction toward the inside of the conduit in at least sections in longitudinal direction of the pipe. Conduits are also preferred wherein at least two wall surfaces of a first and/or second pipe section, particularly of a first pipe section, are aligned essentially parallel to one another, whereby at least one of these wall surfaces comprises at least one indentation in the direction toward the inside of the conduit in at least sections in longitudinal direction of the pipe. The above-described pipe section preferably form the first concrete-free spaces.

In a further advantageous embodiment, these pipe sections with polygonal crossection are characterized in that they comprise at least two successive indentations separated by a protrusion at the inside and/or outside, preferably at the inside, said indentations extending essentially over the entire circumference of the pipe crossection, preferably in an essentially parallel alignment. These first pipe sections preferably have their inside provided with indentations and protrusions following one another in periodic alternation over the entire surface. In another preferred embodiment, correspondingly designed indentations and protrusions are also encountered on the outside of these pipe sections. The manufacture of these pipe sections can be simplified in that the inside indentations correspond with the protrusions on the outside and vice versa. In order to achieve an effective tempering of the concrete floor when flooding the conduit with a fluid, it is not compulsory to conduct the inside indentations in the direction toward the middle of the pipe.

The above-described pipe sections with polygonal crossection that comprise the first concrete-free spaces are usually followed at both sides by sub-sections provided with a smaller diameter than said first pipe sections. Expediently, the diameter of the crossection of the sub-section of the conduit between the first pipe sections is smaller than the largest possible crossectional diameter of these second pipe sections.

These adjoining, second sub-sections can in fact also be provided with a succession of indentations and protrusions in the same way as said pipe sections with polygonal crossection. This, however, is not absolutely necessary. The crossection of these sub-sections is circular or elliptical in a pragmatic embodiment that is favorable for the installation.

The first pipe sections having a preferably polygonal crossection as well as the adjoining pipe sub-sections can follow one another in an arbitrary plurality and form the conduit or a segment of this conduit. These pipe sections generally repeat at identical or nearly identical intervals along the conduit, but can also comprise irregular spacings, for example due to building codes. Although it is possible to select an arbitrary polygonal crossectional shape for each of said pipe sections, it has proven expedient to select a uniform polygonal pipe crossection for pipe sections forming first concrete-free spaces for a conduit system embedded in a concrete floor. For example, two or more pipe sections, particularly successive pipe sections, along a conduit can comprise coinciding or nearly coinciding pipe crossections. It has proven advantageous in pipe sections for first concrete-free spaces with quadratic, trapezoidal or rectangular pipe crossection when one of the diagonals of this pipe section is aligned essentially parallel to the upper side and/or underside of the concrete floor.

In a further embodiment of the conduit, the individual first and second, successively alternating pipe sections are cylindrically designed with larger and smaller crossection or, respectively, diameter and are connectible or, respectively, connected to one another via conical frustum-shaped pipe sections.

The second pipe sub-sections adjoining the first pipe sections forming concrete-free spaces are usually joined with a further pipe sub-section situated at a neighboring first pipe section. These regions formed by two pipe sub-sections between two pipe sections having an essentially polygonal crossection represent second concrete-free spaces.

The conduit segments composed of a plurality of pipe sections can be arranged in an arbitrary way relative to one another. These segments are preferably conducted at a right angle relative to one another; it is especially preferred that they are conducted parallel to one another. To this end, the preferably straight-line conduit segments are connected to one another via pipe sub-sections curved in a corresponding way or, respectively, via curved, second concrete-free spaces.

The conduit system embedded in the concrete floor is preferably provided with at least one pipe admission and at least one pipe discharge via which air, gas or a fluid such as water is introduced into and in turn discharged from the conduit system for the purpose of tempering. The disclosed embodiment of the inventive first and second concrete-free spaces, particularly conduit systems, makes it surprisingly possible to already effectively and lastingly temper concrete floors with air. To that end, for example, outside air can be conducted through the conduit system, for example with the assistance of a fan. It is likewise possible to correspondingly pre-condinion [sic] air before beginning the introduction thereof. Accordingly, cooled, heated, or dehumidified air or, additionally, humidified air can be conducted through the conduit system. Suitable devices with whose assistance this can be accomplished are familiar to a person skilled in the art. The conduit system can likewise be equipped with at least one filter, particularly in the region of the admission. Additionally, fluids can also be conducted through the inventive conduit system as heat transmission medium. For example, water is a suitable liquid medium. For the purpose of tempering the concrete floor, these fluid agents can be conducted through the conduit system cooled or heated in a corresponding way.

In an especially preferred embodiment of the invention, the conduit system is composed of an upper half and a lower half that, for example, are connectible or connected to one another via suitable flanges. Particularly when the aforementioned pipe sections are provided, for example, with a quadratic, trapezoidal or rectangular crossection, the conduit can be parted into two conduit halves in a simple way, for example along a diagonal. In this way, the respective conduit halves can be placed inside one another in space-saving fashion, for example during transport.

In another preferred embodiment of the invention, the conduit system is composed of pipe elements that are formed of said pipe sections with polygonal crossection as well as of pipe sub-sections located at the input and outlet of these sections. These elements can be connected to one another in a very simple way in that, for example, the respective sub-sections are plugged into one another in order to form a conduit segment or to already form the entire conduit system.

In another preferred embodiment of the invention, the two embodiments of the invention described above are present combined with one another. Pipe elements that, for example, are composed of two pipe halves connectible via flanges are accordingly used as pipe elements.

Figure 2:
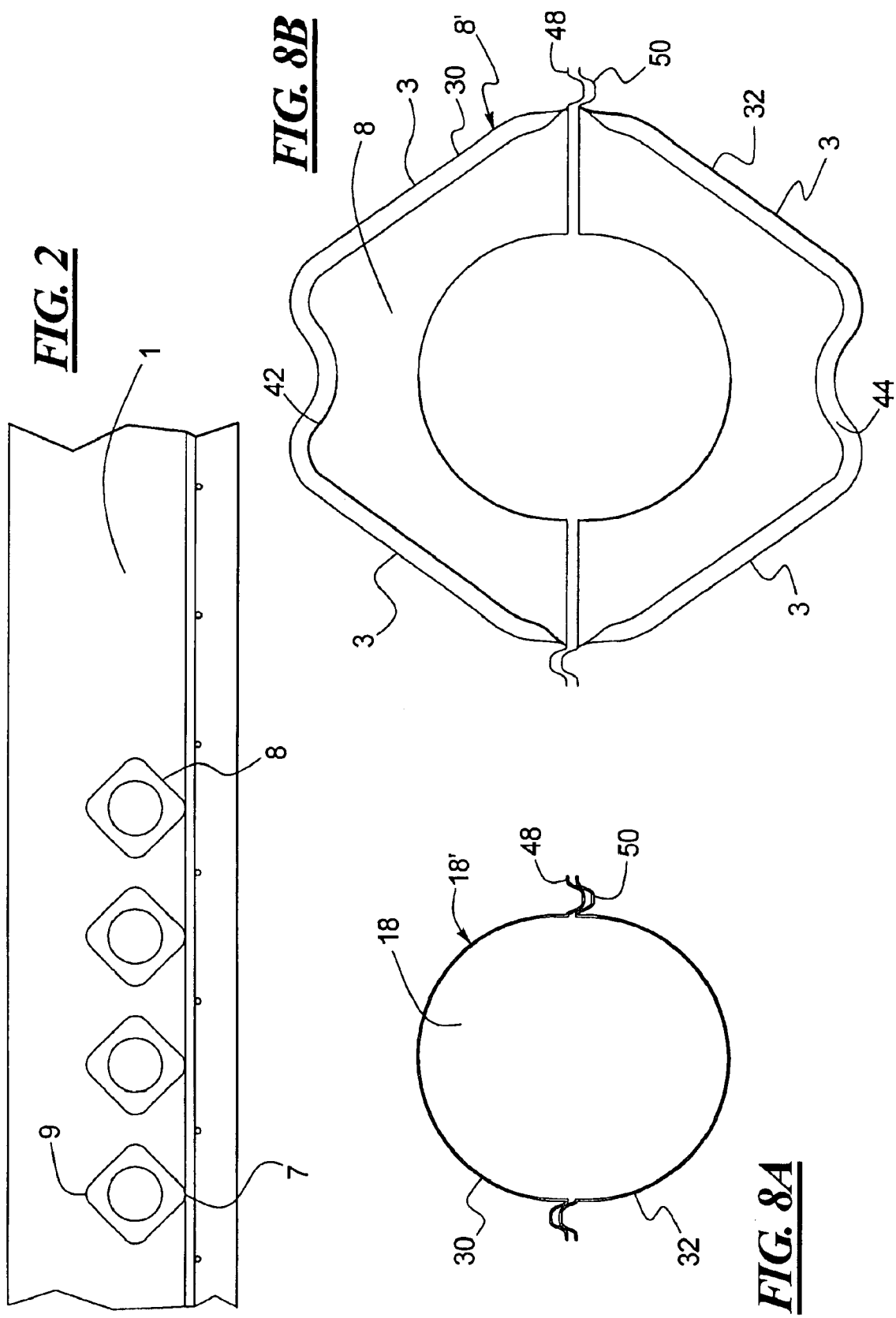
Figure 3:
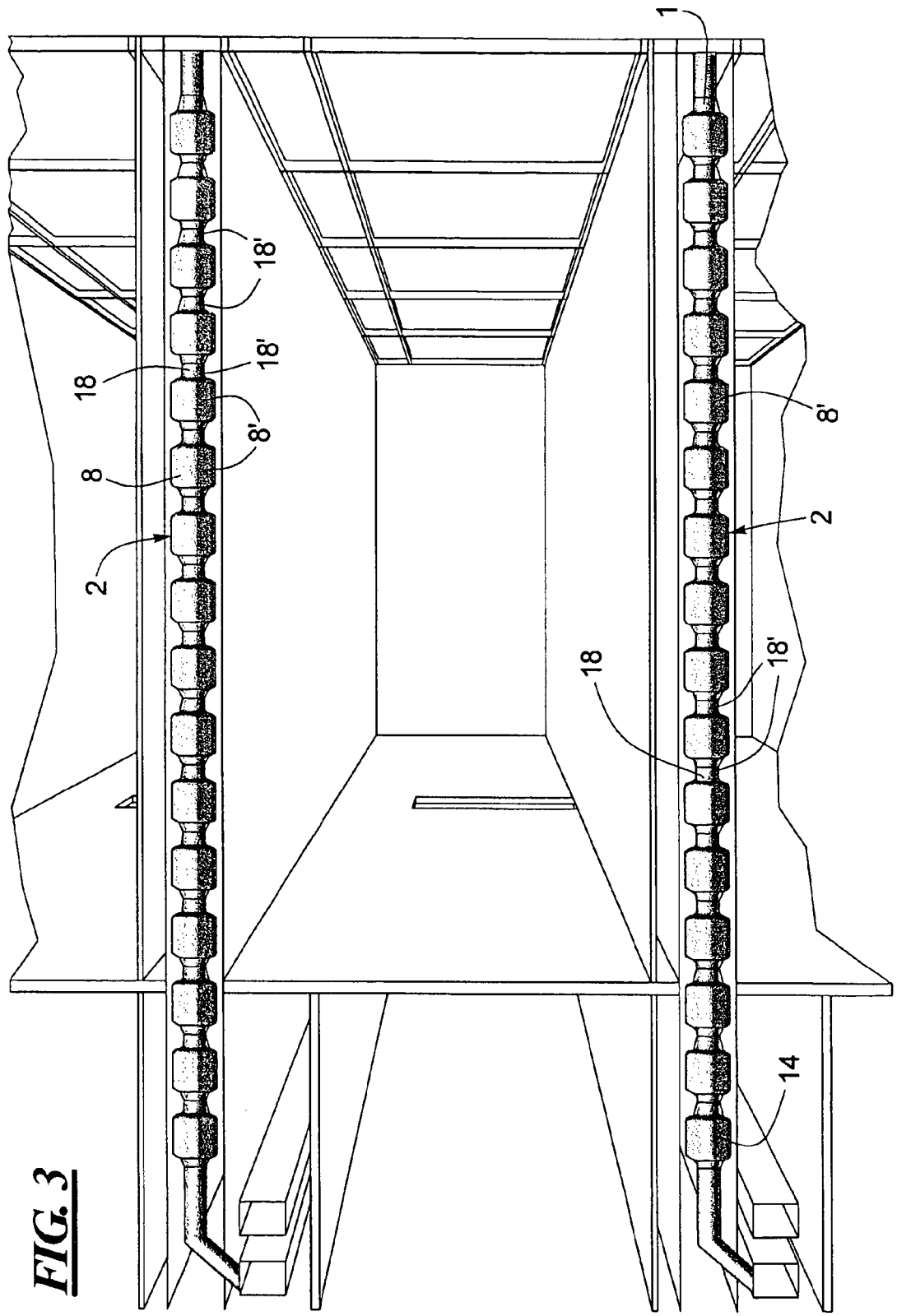
Figure 4:
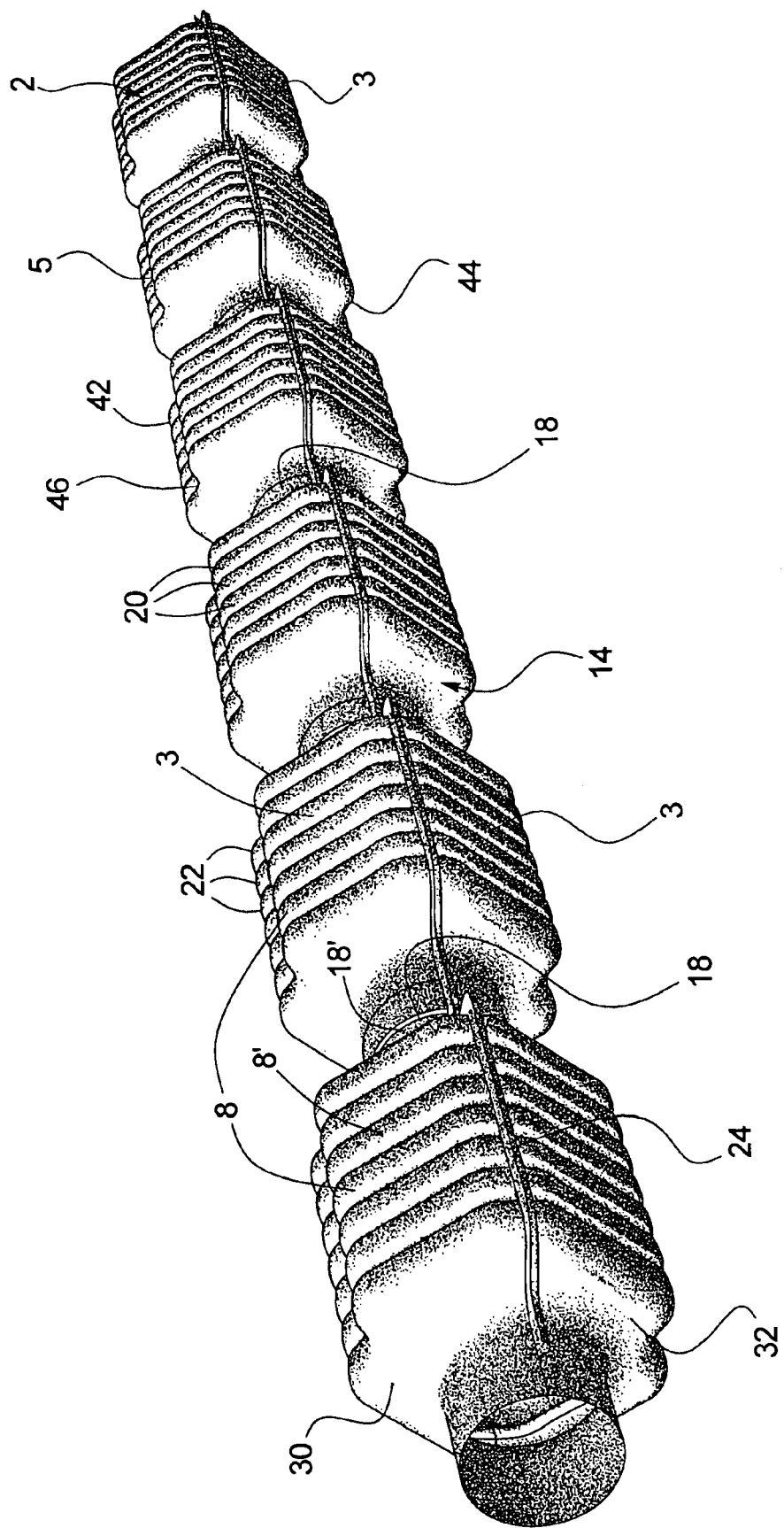
Figure 5:
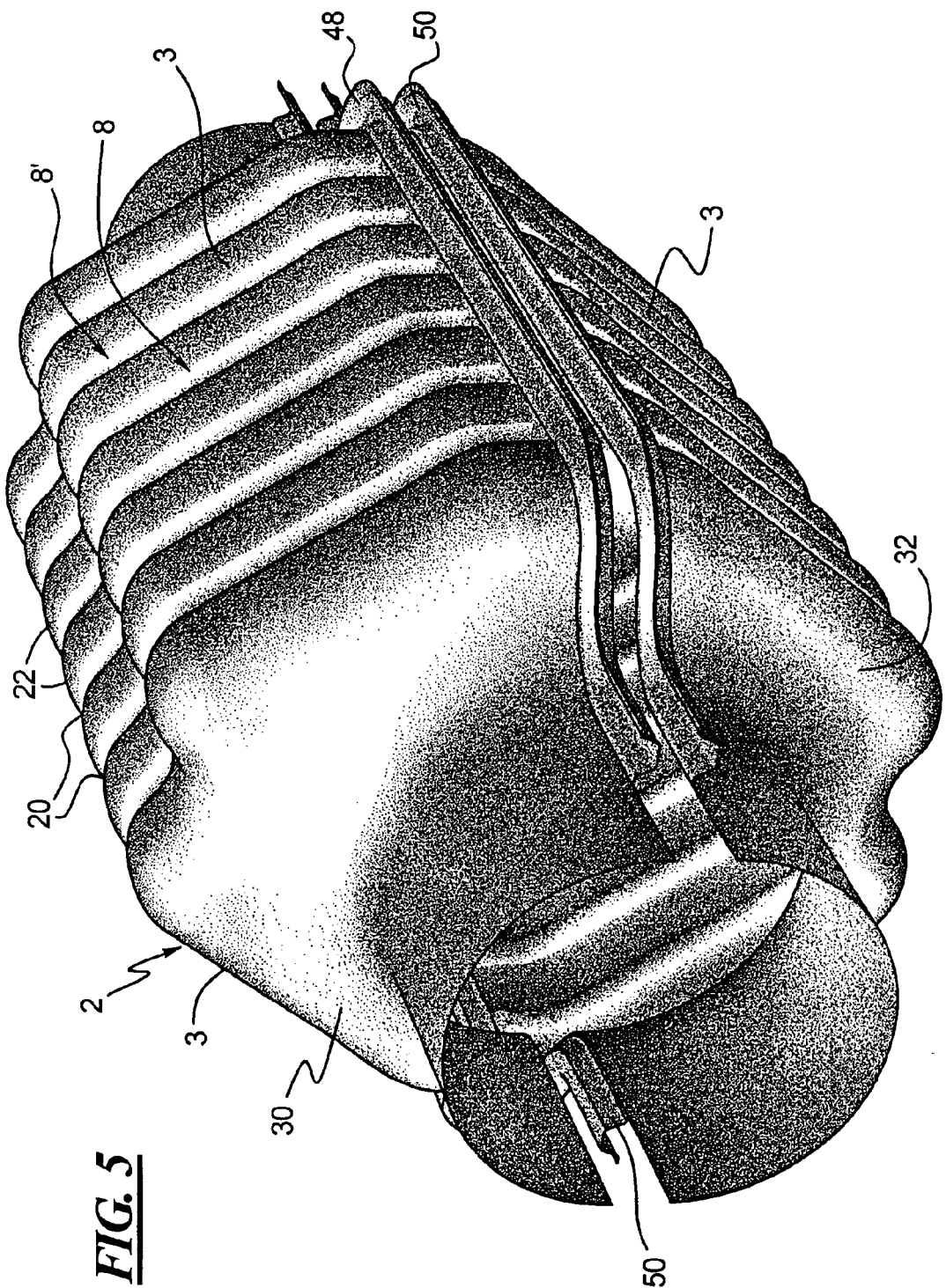
Figure 6:
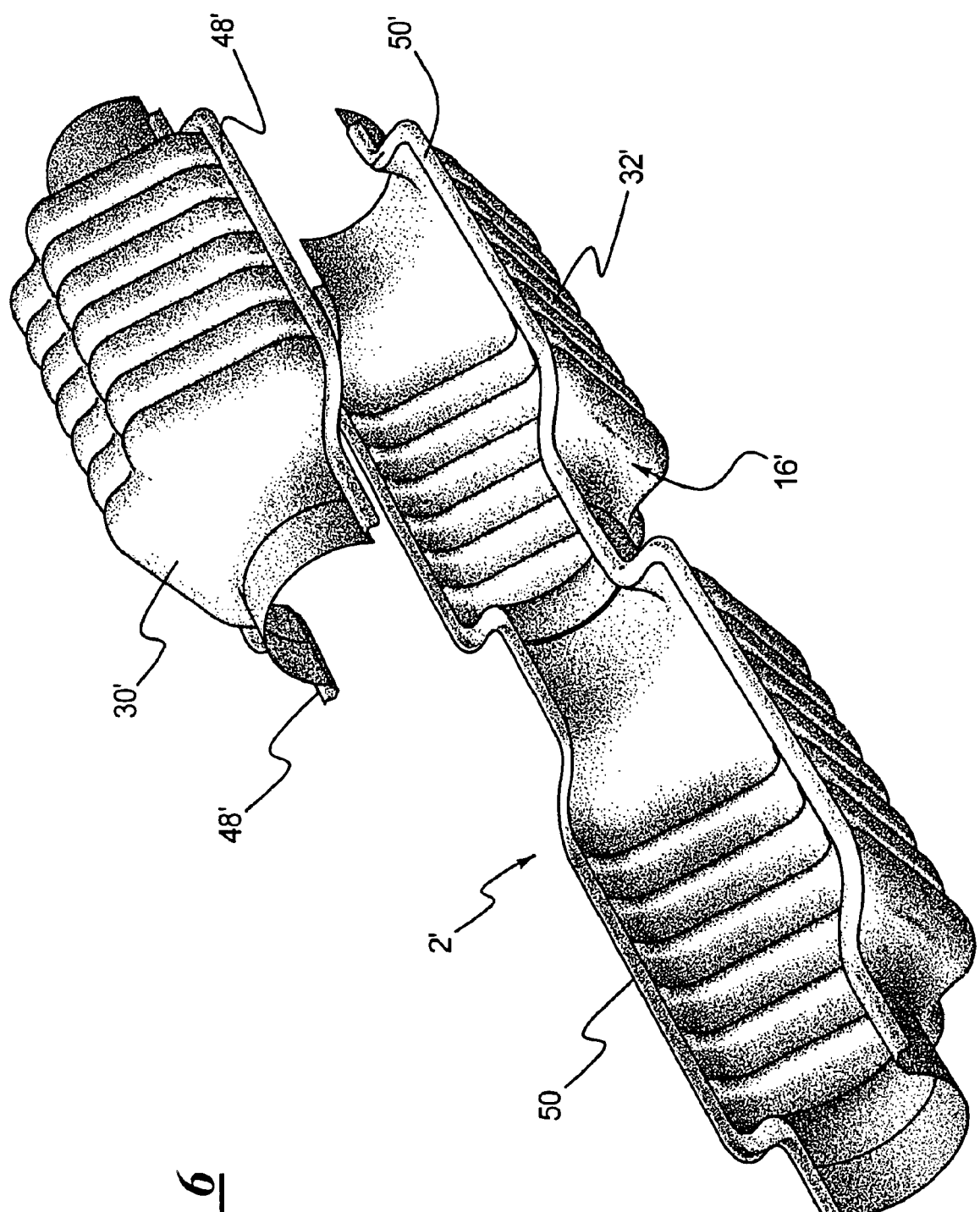
Figure 7:
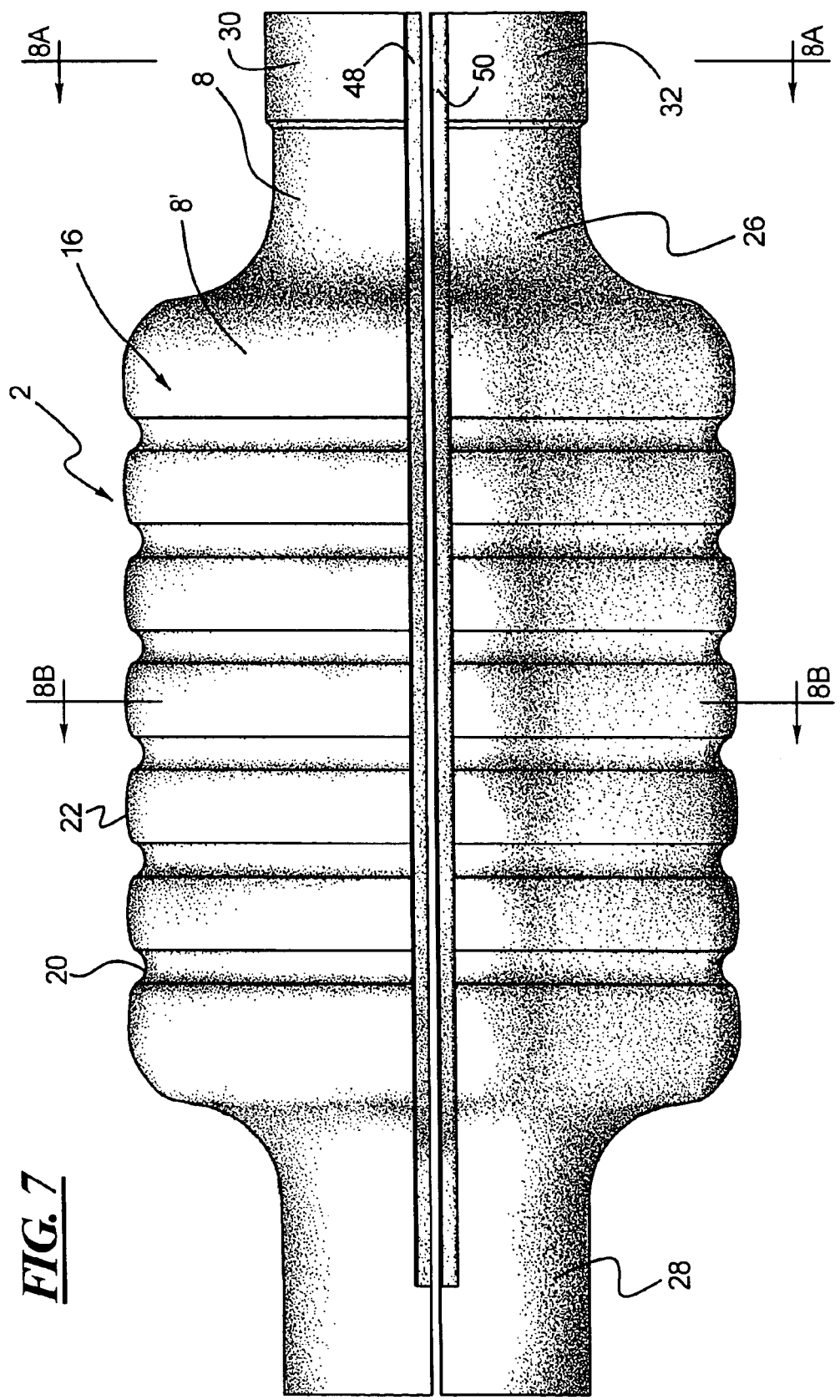
Figure 9:
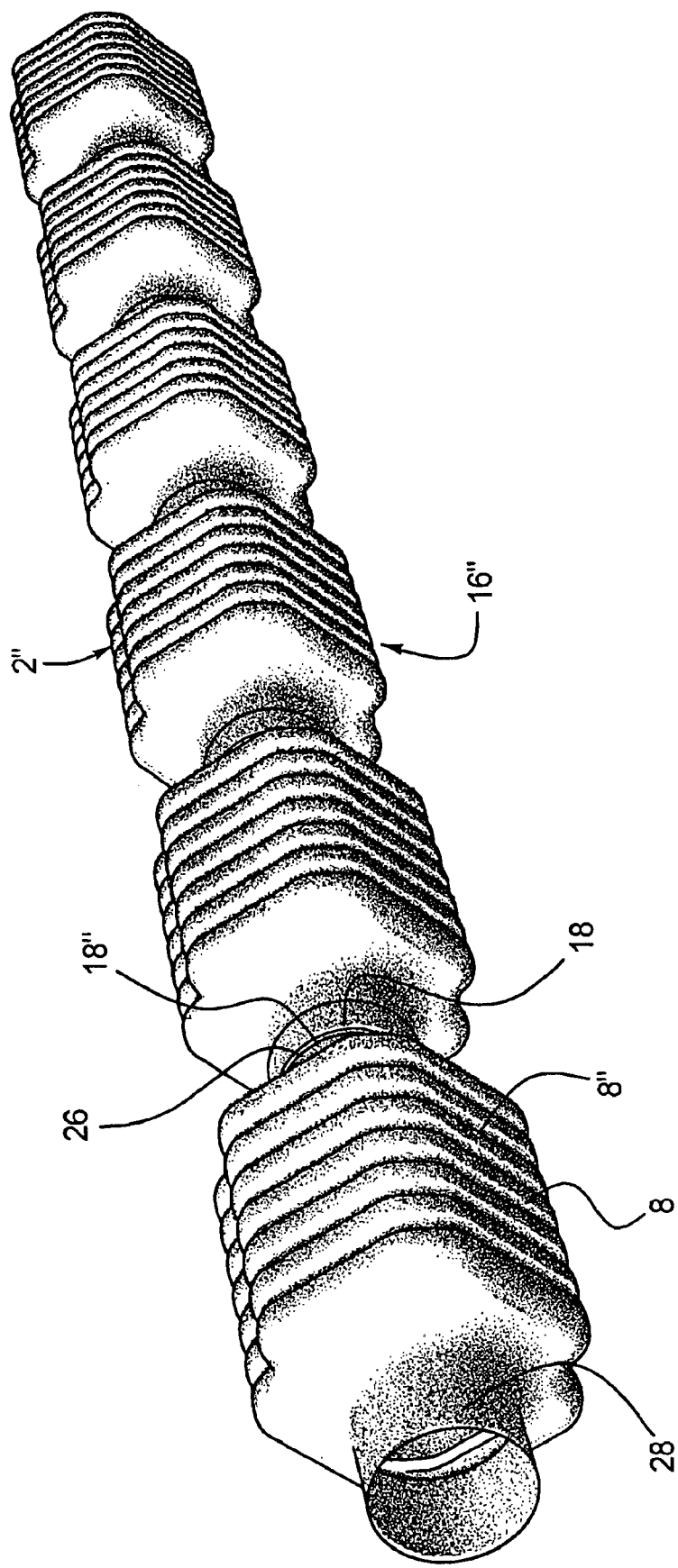

Further embodiments of the invention are described in detail on the basis of the following Figures with no intent that the invention be limited to these specific embodiments. Shown are:

FIG. 1 a perspective side view of two inventive story floors in section;

FIG. 2 a front view of an inventive concrete floor in crossection;

FIG. 3 a perspective side view of two inventive story floors in section;

FIG. 4 an inventive conduit of upper shells and lower shells in a perspective plan view;

FIGS. 5, 6 two embodiments of the shell halves forming the conduit of FIG. 4 in a perspective plan view;

FIG. 7 a side view of section of an inventive conduit;

FIGS. 8a–b crossectional views along the sections A—A and B—B according to FIG. 5; and FIG. 9 an alternative conduit of the invention.

As shown in FIG. 1, an inventive concrete floor 1 can be provided with an upper reinforcement 4 and a lower reinforcement 6. The inventively designed conduit system 2 is located between upper reinforcement 4 and lower reinforcement 6, said conduit system 2 containing an admission 10 and a discharge 12. The conduit system 2 is composed of a plurality of straight-line conduit segments 14 that are arranged parallel to one another, said segments 14 in turn comprising a plurality of successive, first concrete-free spaces 8. The concrete-free spaces are respectively provided with four essentially planar wall surfaces 3 that are not directed parallel or perpendicular to the underside and upper side of the concrete floor. The individual, first conduit sections 8 are connected to one another within the straight-line conduit segments 14 via straight-line sub-sections 18. The respective, parallel conduit segments 14 are connected to one another via curved sub-sections 19. The sub-sections 18, 19 respectively form second concrete-free spaces of the inventive concrete floor 1.

As a result of the conduit system 2 shown in FIG. 1, the concrete floor 1 can, for example, be tempered by conducting cool night air therethrough without further conditioning. After it has reached a temperature at which an efficient cooling is no longer possible, the air employed for cooling or, respectively, tempering can in turn be conducted toward the outside. It is also possible to conduct pre-conditioned air conducted via the illustrated conduit system 2 to a room, particularly after it has been conducted through the ceiling via the conduit system. Means for regulating the pressure, the speed and the temperature of the air conducted through the conduit system 2 are known to a person skilled in the art. In general an air flow-through speed of approximately 1.5 m/sec. already suffices for an appropriate tempering given the inventive concrete floor.

As can already be seen from FIG. 1, the first concrete-free spaces 8 are provided with an essentially quadratic crossection having highly rounded edges, whereby rounded edges 7, 9 lying opposite one another are closest to the underside or, respectively, upper side of the concrete floor. All first concrete-free spaces 8 are aligned in the same way in the conduit system according to FIG. 1. This can also be derived from FIG. 2, which shows four first concrete-free spaces 8 arranged parallel next to one another in crossection. The diagonals between the edges lying opposite one another that do not face toward the upper side or, respectively, underside of the concrete floor lie more or less in one plane and are directed essentially parallel to the upper side or, respectively, underside of the concrete floor. The floor thickness lies at about 30 cm, whereby the maximum horizontal expanse of the first concrete-free spaces 8 lies at approximately 18 cm. About respectively 6 cm of concrete layer can thereby still remain as distance from the upper side or, respectively, underside of the concrete floor. As shown in FIG. 2, moreover, the conduit system can also be applied closer to the underside.

FIG. 3 shows a perspective side view of two inventive story floors 1' as a sectional view through a building. Alternatingly successive first and second concrete-free spaces 8 and 18 respectively form an essentially linear conduit segment 14. The transitions between the first and second concrete-free spaces 8, 18 are not abrupt but proceed via continuously tapering or, respectively, expanding wall elements 34 or, respectively, 36. The conduit segments 14 can be in communication with aeration or, respectively, vent channels 38, 40.

FIG. 4 shows a detailed excerpt from a conduit system that the piping system 2' forms. Pipe sections having a crossection essentially based on a hexagon form the first concrete-free spaces 8'. FIG. 4 thus yields a pipe segment 14' that is composed of pipe sections for the first concrete-free spaces 8' and of second concrete-free spaces 18 lying therebetween. The indentations 20 and protrusions 22 following one another and arranged in parallel at the outside of the pipe section 8' can be clearly seen, these proceeding transversely relative to the longitudinal pipe direction. The upper half 30 and the lower half 32 of the pipe segment 14 are connected to one another via the flange 24. The upper and lower wall surfaces 42, 44 of the concrete-free spaces 8' of the inventive conduit system 2' are respectively provided with an inwardly directed indentation 46 in their longitudinal direction that respectively leads to wall surfaces having an essentially convex or, respectively, concave appearance. This design of wall surfaces 42, 44 lying opposite one another creates seating or, respectively, floor surfaces that enable a dependable working and adjustment of the conduit system 2' into an inventive concrete floor 2'. Given the illustrated embodiment, for example, the conduit system 2' can be placed onto a layer of concrete that has not yet cured without having the pipe sections forming first concrete-free spaces 8' tilt or twist.

FIG. 5 shows said upper and lower pipe halves 30 and 32 of a pipe element 16 before being joined. As can be seen, the protrusions and indentations 20, 22 run completely around the circumference of the first pipe section 8'. Moreover, the indentations 20 on the outside can correspond with the protrusions on the inside (not shown), and the protrusions 22 on the outside can correspond with the indentations on the inside (not shown). The upper and lower halves 30, 32 are respectively equipped with an upper or, respectively, lower fold 48, 50 at their edges. The upper and lower folds or, respectively, flanges 48, 50 are preferably fashioned channel-like, as a result whereof a simple and dependable adjustment and meshing or, respectively, assembly of the conduit system is considerably facilitated. Once they have been placed on top of one another, a slippage of the upper and lower halves 30, 32 is no longer possible, particularly when the upper half 30 is weighted with concrete material. The folds, of course, can also assume other, suitable geometrical crossectional shapes, for example a triangular or rectangular shape.

FIG. 6 shows a further embodiment of a conduit 2'0 constructed of shell halves. In the present case, two lower halves 32' of a pipe element are integrally joined to one another and can be respectively provided with an upper half of the pipe element 30. It has proven advantageous to design folds of the lower or, respectively, upper pipe half 30, 32 that lie opposite one another diametrically opposed. When, for example, the folds 48, 50 of the one side of the pipe element 16 opens downward, then the channel-shaped folds lying thereopposite are upwardly open.

An adjustment of upper and lower halves 30, 32 succeeds especially well when at least one upper or lower fold is provided with an opening (not shown) through which a rivet or a foldable collar can be introduced from the opposite side of the fold.

Finally, FIGS. 5 and 6 yield how the inventive conduit system 2' of upper and lower half 30, 32 of the pipe element 16 with further upper and lower halves 32 and 30 (not shown) can be assembled in a simple way to form a complete pipe segment 14 by attaching to and atop one another.

Further, arbitrary auxiliary elements for bent-up bars [sic] of a concrete slab, particularly a reinforced concrete slab, can be attached to the conduit system 2' as well as to its individual component parts or can be directly applied from the corresponding conduit material. Further, corresponding mounts can likewise be present at the conduit system 2' or can be subsequently attached for buoyancy protection.

FIG. 7 shows a side view of a section of an inventive conduit 2' according to FIG. 5. The pipe section forming the first concrete-free space 8' is provided with a larger crossection or, respectively, diameter compared to the pipe input or, respectively, pipe outlet sub-sections 26 and 28. The pipe outlet syb-section 28 is designed such that it can accept the pipe input sub-section 26 of a further pipe element 16 flush upon formation of a second concrete-free space 18. As can also be derived from FIG. 7, the transitions between the pipe sections that for the first and second concrete-free sections are not fashioned abruptly but gradually. How the upper and lower folds 48, 50 positively engage into one another upon formation of a conduit system is especially clear on the basis of the crossectional views at the positions A—A or, respectively, B—B shown in FIGS. 8*a* and 8*b*. The pipe segment forming a second concrete-free space 18 is thereby fashioned circular in crossection. In contrast, the pipe section forming a first concrete-free space 8' has an essentially hexagonal crossectional shape with essentially parallel wall surfaces 42, 44 lying opposite one another that comprise a concave or, respectively, convex arc in the direction toward the inside of the pipe.

FIG. 9 shows a perspective view of an alternative conduit 2" of the invention. The pipe sections forming the first concrete-free spaces 8" are integrally fashioned and are likewise provided with integrally applied pipe input and pipe outlet sub-sections 26, 28. The pipe input and pipe outlet sub-sections 26, 28 can be plugged into one another upon formation of second concrete-free spaces 18'. This embodiment is especially expedient when the conduit system 2" is fabricated of plastic since these pipe elements 16 can be formed in one work step without further ado by means of blow molding.

The inventive concrete floors containing a flow-through conduction system as well as, in particular, the inventive conduit system also makes it possible for the first time to offer story or, respectively, floor slabs of concrete or, respectively, reinforced concrete in a simple and cost-beneficial way that allow buildings to be tempered efficiently and in an energy-saving way. For example, the inventive concrete floors are suitable for employment in the construction of energy-efficient houses, for example what are referred to as passive houses, and thus critically contribute to being able to design buildings that can completely or nearly completely forego traditional heating systems.

Both individually as well as in any arbitrary embodiments [sic], the features disclosed in the above specification as well as in the claims can be critical for the realization of the invention.

A considerable weight reduction can be effected with the inventive concrete floor without having to do battle [sic] with sacrifices of rigidity. Without further ado, thus, the weight of traditional concrete floors can be reduced by more than approximately 10%, preferably more than 15% and, particularly preferred, by more than 20 weight-%, whereby values of 25% and above are also achieved. As a result of this weight reduction, for example, foundations of buildings can be designed slighter, which leads to a considerable overall cost savings especially given multi-story buildings.

It has also been surprisingly found that the inventive concrete floors have a flexural strength that does not deviate from that of traditional concrete floors or that, if it does deviate, deviates only slightly therefrom, namely in longitudinal direction as well as transverse direction. The same is true of the creep [?] strength. The departures compared to traditional concrete floors lie in the range up to about 10%, preferably in the range up to about 5%. Like concrete floors that have no concrete-free spaces, the inventive concrete floor thus has an isotropic or nearly isotropic mechanical behavior, especially in view of the flexural strength as well as in view of the creep [?] strength and, accordingly, can also be processed with standard, commercially available static calculation programs. Both individually as well as in any arbitrary combination, the features disclosed in the above specification, in the claims as well as in the drawings can be critical for the realization of the various embodiments of the invention.

Both individually as well as in any arbitrary combination, the features disclosed in the above specification, in the claims as well as in the drawings can be critical for the realization of the various embodiments of the invention.

What is claimed is:

1. A concrete floor, comprising:
    an upper side and an underside with concrete in between;
    in said concrete a plurality of first concrete-free spaces each having at least two wall surfaces, said at least two wall surfaces being aligned substantially not parallel and not perpendicular to at least one of said under side and upper side;
    a plurality of second concrete-free spaces in said concrete communicating with and spacing apart said first concrete-free spaces to form a substantially straight line segment of said first and second concrete-free spaces;
    a plurality of said segments substantially parallel to each other and with the first concrete-free spaces being substantially aligned across from each other in a direction perpendicular to a direction of said straight line segments; and
    said first concrete-free spaces having a maximum diameter in cross-section larger than a maximum diameter in cross-section of said second concrete-free spaces.

2. The concrete floor according to claim 1 wherein the first concrete-free spaces have a polygon-shaped cross-section and at least four wall surfaces, tapering end portions where they join with the second concrete-free spaces, and none of said at least four wall surfaces being parallel or perpendicular to at least one of said under side and upper side.

3. The concrete floor according to claim 1 wherein the first concrete-free space is defined by a first conduit section, said first conduit section having four substantially planar wall surfaces and at least one rounded off edge between two of the wall surfaces, and none of said four wall surfaces being substantially parallel or perpendicular to at least one of the under side and upper side of the concrete floor.

4. A concrete floor according to claim 3 wherein a parallel wall surface is provided between each of two of said four wall surfaces which is substantially parallel to at least one of the upper side and under side of the concrete floor, and wherein each of said parallel wall surfaces has a concave indentation pointing inwardly towards said first concrete-free space.

5. The concrete floor according to claim 1 wherein the concrete-free spaces contain a plastic material.

6. The concrete floor according to claim 1 wherein the first concrete-free spaces alternate with the second concrete-free spaces at least in sections.

7. The concrete floor according to claim 1 wherein the first concrete-free space is defined by a first conduit section having a polygon-shaped cross-section, and between successive first conduit sections a second conduit section substantially circular in cross-section is provided defining said second concrete-free space, said second conduit section joining the successive first conduit sections.

8. The concrete floor according to claim 1 wherein first concrete-free space is defined by a polygon-shaped first conduit section having four planar walls, none of which are parallel or perpendicular to at least one of said upper side and under side of the concrete floor, and wherein the first conduit section has an upper half joined to a lower half at a flange.

9. A concrete floor according to claim 1 wherein the first concrete-free space is formed by a polygon-shaped first conduit section and wherein successive first conduit sections are joined by respective second conduit sections and wherein the first conduit section has a central wide portion and tapering down sections leading from the central wide portion to the second conduit sections.

10. The concrete floor according to claim 1 wherein the concrete-free spaces contain at least one of a gas and a fluid.

11. The concrete floor according to claim 1 wherein the first and second concrete-free spaces comprise a conduit system having at least first and second conduit sections, and an admission opening and a discharge opening being provided to said conduit system.

12. The concrete floor according to claim 1 wherein the first concrete-free spaces are defined by respective first conduit sections, said first conduit sections having a plurality of wall surfaces, at least one of which has successive indentations separated by respective protrusions, said indentations and protrusions being substantially parallel to each other.

13. The concrete floor according to claim 1 wherein the first concrete-free spaces are defined by respective first conduit sections having a quadrangular cross-section and rounded-off edges between wall surfaces.

14. The concrete floor according to claim 1 wherein the second concrete-free spaces are defined by respective second conduit sections which are substantially round in cross-section and which link the first concrete-free spaces to the second concrete-free spaces.

15. The concrete floor according to claim 1 wherein the first and second concrete-free spaces are defined by respective first and second conduit sections that alternate in succession and are arranged along a straight line to form a segment.

16. The concrete floor according to claim 15 wherein at least two of said segments are connected by a curved conduit section.

17. the concrete floor according to claim 1 wherein a reinforcement is present in the concrete floor.

18. The concrete floor according to claim 1 wherein the first and second concrete-free spaces comprise respective first and second metal conduit sections.

19. The concrete floor according to claim 1 wherein the first and second concrete-free spaces comprise respective first and second conduit sections formed of plastic.

20. The concrete floor according to claim 1 wherein the first concrete-free spaces are formed by respective first conduit sections having at least one wall surface having successive protrusions and indentations.

21. The concrete floor according to claim 1 wherein the first concrete-free spaces are defined by respective first conduit sections, each conduit section comprising a lower part and an upper part connected by a flange along opposite side edges of the lower and upper parts.

22. A concrete floor, comprising:
    an upper side and an under side;
    a plurality of first conduit sections connected by respective second conduit sections to form a substantially straight line segment, said first conduit sections having a maximum cross-sectional diameter larger than a maximum cross-sectional diameter of the second conduit sections, a plurality of said straight line segments substantially parallel to each other, and said plurality of said segments forming a conduit system having at least one admission opening and at least one discharge opening, wherein said first and second conduit sections define respective first and second concrete-free spaces, and wherein each of said first conduit sections has tapering end portions connected to said second conduit sections, and at least two wall surfaces which are not parallel and not perpendicular to said upper side and under side, and wherein the first conduit sections are substantially aligned with each other in a direction perpendicular to a direction of said straight line segments.

23. The concrete floor according to claim 22 wherein substantially an entire region of said concrete floor is filled with cement except for said first and second concrete-free spaces, and wherein said concrete floor comprises a floor story of a building.

24. The concrete floor according to claim 22 wherein the concrete floor has a substantially isotropic mechanical behavior.

25. The concrete floor according to claim 22 wherein the first conduit sections lie between successive second conduit sections.

26. The concrete floor according to claim 22 wherein the first conduit section comprises four walls, none of which are parallel or perpendicular to at least one of said upper side and under side of said floor.

27. The concrete floor according to claim 22 wherein the concrete floor comprises a floor story in a building and said concrete floor is tempered.

28. The concrete floor according to claim 22 wherein the floor comprises a building story floor and the first and second conduit sections carry at least one of a heating and cooling medium.

29. A concrete floor heating or cooling system, comprising:
- a concrete slab having parallel upper and under sides;
- within the concrete slab a plurality of first conduit sections connected by second conduit sections, the first conduit sections having a maximum inner diameter larger than a maximum inner diameter of the second conduit sections;
- the second conduit sections joining the first conduit sections;
- an admission opening and a discharge opening through which at least one of a heating or cooling medium flows;
- the second conduit sections joined to the first conduit sections forming a straight line segment, a plurality of said straight line segments being provided parallel to each other, and the first conduit sections and adjacent segments being aligned with each other in a direction substantially perpendicular to a direction of said straight line segments; and
- each of the first conduit sections having at least two wall surfaces which are aligned substantially not parallel and not perpendicular to at least one of said under side and upper side.

30. The system according to claim 29 wherein the first and second conduit sections form a conduit system comprising segments and connecting curved sections, and wherein the concrete slab has upper and lower reinforcements and the conduit system is positioned between the upper and lower reinforcements.

31. The system according to claim 29 wherein the first conduit section is substantially quadrangular with four principle main walls, none of said four main walls being perpendicular or parallel to the upper and under sides of the floor.

32. The system according to claim 29 wherein the second conduit sections are substantially round in cross-section and couple the first conduit sections together.

33. The system according to claim 29 wherein each first conduit section has tapered ends adjoined to respective second conduit sections and wherein the second conduit sections couple to each other to form at least one segment of the conduit system.

34. The system according to claim 29 wherein the first and second conduit sections comprise metal.

35. The system according to claim 29 wherein the first and second conduit sections comprise plastic.

36. The system according to claim 29 wherein the segments being joined by a curved section.

37. A concrete floor, comprising:
- an upper side and an under side with concrete in between;
- in said concrete a plurality of first concrete-free spaces each having at least one wall surface which is aligned substantially not parallel and not perpendicular to at least one of said underside and upper side;
- a plurality of second concrete-free spaces in said concrete communicating with and spacing apart said first concrete-free spaces to form a substantially straight line segment of said first and second concrete-free spaces;
- a plurality of said segments substantially parallel to each other and with the first concrete-free spaces being substantially aligned across from each other in a direction perpendicular to a direction of said straight line segments, and wherein said at least one wall surface of the first concrete-free space of one line segment running in a direction substantially the same as a direction of the at least one wall surface of the adjacent first concrete-free space of the adjacent line segment; and
- said first concrete-free spaces having a maximum diameter in cross-section larger than a maximum diameter in cross-section of said second concrete-free spaces.

38. A concrete floor of claim 37 wherein said first concrete-free spaces having tapering end portions connected to said second concrete-free spaces.

39. A floor of claim 37 wherein at least four wall surfaces are provided aligned substantially not parallel and not perpendicular to at least one of said under side and upper side.

40. A floor of claim 37 wherein the first concrete-free spaces have walls with inwardly and outwardly extending portions.

41. A floor of claim 37 wherein a top and bottom of each first concrete-free space has two substantially parallel ridges.

42. A floor of claim 37 wherein the first and second concrete-free spaces are formed by metal conduits, the segments are connected together, and an inlet and outlet is provided for at least one of cooling or heating medium to be passed through the conduits to at least one of heat or a cool region adjacent to the concrete floor.

* * * * *